United States Patent [19]
Corduan et al.

[11] Patent Number: 5,590,544
[45] Date of Patent: Jan. 7, 1997

[54] PROCESS AND APPARATUS FOR RECOVERY OF PURE ARGON

[75] Inventors: Horst Corduan, Puchheim; Wilhelm Rohde, Munich, both of Germany

[73] Assignee: Linde Aktiengesellschaft, Germany

[21] Appl. No.: 393,389

[22] Filed: Feb. 23, 1995

[30] Foreign Application Priority Data

Feb. 24, 1994 [DE] Germany ............................ 44 06 049.1
Feb. 24, 1994 [DE] Germany ............................ 44 06 069.6

[51] Int. Cl.⁶ ..................................................... F25J 3/00
[52] U.S. Cl. ................................................. 62/656; 62/924
[58] Field of Search ..................................... 62/22, 24, 37, 62/656, 924

[56] References Cited

U.S. PATENT DOCUMENTS

| | | | |
|---|---|---|---|
| 4,935,044 | 6/1990 | Schoenpflug | 62/22 |
| 5,019,145 | 5/1991 | Rohde et al. | 62/22 |
| 5,282,365 | 2/1994 | Victor et al. | 62/22 |
| 5,305,611 | 4/1994 | Howard | 62/22 |

FOREIGN PATENT DOCUMENTS 0171711  2/1986  European Pat. Off. .

OTHER PUBLICATIONS

Patent Abstracts of Japan, vol. 17, No. 517 (M–1481) (Sep. 17, 1993).

*Primary Examiner*—Ronald C. Capossela
*Attorney, Agent, or Firm*—Millen, White, Zelano, & Branigan, P.C.

[57] ABSTRACT

A process and apparatus for recovery of pure argon from air utilize a rectification system comprising at least one air separating column (9) and a pure argon column (25). An argon-enriched mixture (24) of air gases is introduced into the pure argon column (25) in the lower region of which an essentially nitrogen-free argon product (26) is recovered. The head fraction (28) of the pure argon column (25), is liquefied at least partly by indirect heat exchange (29) using the evaporating cooling medium (11, 30). The condensate (28a) formed thereby is returned into the pure argon column. The indirect heat exchange (29) is carried out by means of a cooling medium (11, 30) which has an oxygen content of at least 10%. Independently thereof, the lower region of the pure argon column (25) is heated by indirect heat exchange (27) by means of a heating medium (11) in a liquid state, for example, with sump liquid from a pressure column (8).

42 Claims, 5 Drawing Sheets

PROCESS AND APPARATUS FOR RECOVERY OF PURE ARGON

SUMMARY OF THE INVENTION

The invention relates to a process and an apparatus for the recovery of pure argon in which air is separated in a rectification system, using at least one air separating column and a pure argon column. An argon-enriched mixture of air gases is introduced into the pure argon column and from the lower region of the pure argon column an essentially nitrogen-free argon product is withdrawn.

The principles of pure argon recovery are described in Hausen/Linde, Tieftemperaturtechnik (Low Temperature Technology), 2nd edition, pp. 332–334 (1985). Processes and apparatus of the type referred to in the introduction are moreover known from the patent publications EP-B-0 377 117, EP-A-0 171 711, EP-A-0 331 028, U.S. Pat. Nos. 5,019,145 and 4,935,044. In those instances the air separation, in the narrower sense of separating air into oxygen and nitrogen, is generally conducted in a double column having a high pressure column and a low pressure column and the input fraction for a crude argon column is withdrawn from the low pressure column of the double column. The oxygen-depleted crude argon is freed of more volatile impurities, in particular of nitrogen, in a further rectification column, the pure argon column. Between the crude argon and the pure argon column a further stage for oxygen removal may be provided, for example, by catalytic oxidation with hydrogen (Deoxo apparatus, c.f., e.g., EP-A-0 171 711 or EP-A-0 331 028).

The invention is, however, not tied essentially to the conventional sequence of argon purification (oxygen removal prior to nitrogen removal). The conventional terms crude argon column (in the sense of a column for the removal of oxygen) and pure argon column (in the sense of a separation between argon and nitrogen) are used herein without the aforesaid sequence, oxygen removal prior to nitrogen removal, being fixed thereby.

In order to perform rectification in the pure argon column, the exchange of heat both in the upper region of the column (normally at the head) as well as in the lower region thereof (normally its sump) are needed. Heat is withdrawn by means of a head cooling means so as to generate a liquid reflux; in doing so the head fraction of the pure argon column is liquefied at least in part by indirect heat exchange against an evaporating cooling medium. The condensate formed due to the indirect heat exchange is recycled into the pure argon column. On the other hand, heat exchange in the sump introduces heat into the column in order to provide rising vapor. Heat is introduced by virtue of bringing a liquid fraction from the lower region of the pure argon column into indirect heat exchange with a heating medium.

The head cooling of the pure argon column proceeds normally by indirect heat exchange with liquid nitrogen from the high pressure column of a double column air separator. In this manner, a cooling medium is made available by means of which exceedingly low temperatures can be attained. The condensation of the nitrogen-rich residual fraction at the head of the pure argon column thus represents no problem.

On the other hand, difficulties—sometimes quite serious—may arise in the case of operational failures or faulty operation. More particularly, if in such a situation the argon content rises at the head of the pure argon column, solid argon may be deposited which would block the head condenser and give rise to substantial costs. Up to now, attempts have been made to avoid this risk by controlling and regulating means which are supposed to ensure that the temperature at the head of the pure argon column does not drop below the melting point of argon. However, such means are not fully satisfactory. In particular, they give rise to very high costs.

Heating of the lower region of the pure argon column is brought about conventionally by indirect heat exchange using a condensing gaseous fraction, for example, gaseous nitrogen from the high pressure column of a double column air separator. This causes the heating medium to be liquefied as a rule at least in part. In order to be able to utilize this condensate sensibly in liquid form (for example, as reflux for a separating column or as coolant in a condenser-evaporator), it is necessary, in the case of merely partial condensation, to interpose a separator in the sump heating means of the pure argon column, or to take care that, by means of appropriate regulating means, the exact amount of heating medium needed for heating the sump of the pure argon column is conducted through the sump evaporator and, in the course thereof, is condensed substantially completely. Both of these techniques involve relatively high expenditure.

Accordingly, an object of the invention is to provide a process and apparatus of the type described above, in a more cost-effective manner, and in particular provides an especially advantageous design of heat exchange for the pure argon column with different process flows.

Upon further study of the specification and appended claims, further objects and advantages of this invention will become apparent to those skilled in the art.

These objects are attained according to a first aspect of the invention in that the indirect heat exchange for cooling the head of the pure argon column is carried out with a cooling medium having an oxygen content of at least 10 vol. %, preferably 32–40 vol. %, especially 33–38 vol. %.

In the context of the invention, it was found that it is possible, without grave losses of product quality and quantity, to dispense with nitrogen as a cooling medium for the pure argon column and to use instead an oxygen-containing mixture of air gases. The composition of the latter can be selected so that even at atmospheric pressure or a few tenth of a bar thereabove it has a boiling point above the triple point of argon, which is nevertheless adequate for the condensation of the heat fraction. Accordingly, a freezing out of solid argon is impossible in principle; regulatory action in that regard can be dispensed with entirely. Preferably, the composition of the oxygen-containing mixture of air gases exhibits a boiling point above the triple point of argon at a pressure of 1.6 bar or less, especially 1.4 bar or less.

This mode of operation ensures a reliable operation of the pure argon column at reasonable cost. In particular, it involves relatively little regulating expenditure.

Various liquid process streams can be used as the cooling medium. Preferably, the cooling medium is withdrawn from the lower or middle region of at least one air separation column, in particular, the high pressure stage of a double column. Particularly advantageous is the use of sump liquid from the bottom of the high pressure stage as cooling medium for removing heat from the head of the pure argon column.

The reference to "cooling medium" is not meant to exclude the use of other fractions contributing to the head cooling of the pure argon column, for example, mixing such other fraction(s) with the cooling medium upstream of the indirect heat exchange with the head fraction. Nevertheless, the contribution of that fraction expressly referred to as the cooling medium is to be the decisive factor for the generation of reflux at the head of the pure argon column.

According to a further embodiment according to the invention, an argon-containing fraction is introduced into a crude argon column and oxygen-depleted argon is recovered at the head of the crude argon column. A portion of the oxygen-depleted argon is liquefied by indirect heat exchange with the same cooling medium used in the indirect heat exchange for partial condensation of the head fraction of the pure argon column. The indirect heat exchange with the oxygen-depleted argon is carried out in a condenser-evaporator, wherein the cooling medium is fed into the evaporator side thereof and the oxygen-depleted argon, as well as optionally the head fraction of the pure argon column, are at least partly liquefied.

In the usual event that a crude argon column is present, the head of which is likewise to be cooled for the generation of reflux, in accordance with this aspect of the invention the same cooling medium can be applied both for head cooling of the crude argon column as well as head cooling of the pure argon column. In particular, the cooling medium is sump liquid from the high pressure column.

In this context it is advantageous, from a process technological point of view, to bring the cooling medium into indirect heat exchange with the head fraction of the pure argon column upstream of the point at which the cooling medium is fed into the condenser-evaporator. The cooling medium or a portion of the cooling medium thus flows initially through a heat exchanger which operates as the head condenser of the pure argon column prior to the cooling medium being introduced into the condenser-evaporator. In doing so, so little cooling medium is evaporated as compared with the crude argon column head condenser, that the composition of the liquid component of the cooling medium fed into the condenser-evaporator and accordingly the boiling point is not changed noticeably. (This applies in particular if, according to the aforesaid aspect of the invention, essentially the entire sump liquid withdrawn from the pressure column is passed through the condenser-evaporator.)

However, the most cost-effective embodiment resides in the employment of a common condenser-evaporator for the crude argon column and the pure argon column, in that accordingly indirect heat exchange between the cooling medium and the head fraction of the pure argon column is carried out within the condenser-evaporator. For that purpose it is possible, for example, for a heat exchanger block to be installed in the condenser-evaporator which comprises separate passages for the head fractions of the crude argon column and of the pure argon column and optionally further passes (for example, for nitrogen-free argon products), all of which are in heat exchange relationship with the evaporating cooling medium.

Vapor of the cooling medium generated on the evaporation side of the condenser-evaporator can be withdrawn and fed to the low pressure column at an intermediate position which corresponds to its composition. It accordingly remains further available for the recovery of the components contained therein, in particular nitrogen, oxygen and noble gases.

It is particularly advantageous to pass an amount of the cooling medium into the condenser-evaporator which is greater than that needed for liquefying the head fractions of the crude argon column and the pure argon column (for example, a major part of the sump liquid withdrawn from the pressure column), and to withdraw from the evaporation side of the condenser-evaporator that portion of the cooling medium which remains in liquid form and deliver it to the low pressure column at an intermediate position which corresponds to its composition.

That portion of the cooling medium which has remained liquid is preferably fed into the low pressure column at a point above the feed position of the evaporated cooling medium. The reason is that, due to the surplus of cooling medium, it has a relatively high nitrogen content as compared with a practically total evaporation at the condenser-evaporator and can, therefore, be employed as reflux in a larger region of the low pressure column. This contributes to an improvement in the separation effect.

It is advantageous if substantially the entire amount of sump liquid forming in the lower region of the high pressure column is used as cooling medium, for example, more than about 70%, especially more than 90%, in particular more than 99%.

The cooling medium which remains liquid can be withdrawn from the condenser-evaporator by way of an overflow means.

The overflow means may take the form of any known means, for example, an upwardly open tube provided in the evaporation space, a duct connected at the level of the desired liquid level or a siphon-like duct (downwardly open U, highest portion at the level of the desired liquid level).

According to a further development of the inventive concept, the evaporation side of the condenser-evaporator is subdivided into a first and a second partial space by a partition, the gas and the liquid spaces of the two partial spaces being in mutual communication. The cooling medium is fed into the first partial space which is in heat exchange relationship with the head fraction of the pure argon column. The second partial space is in heat exchange relation with the oxygen-depleted argon from the crude argon column.

The heat exchange relationship can be brought about in various manners. On the one hand, a heat exchanger can be installed in the appropriate partial space. On the other hand, alternatively or in addition, liquid from the partial space can be discharged into the heat exchanger provided on the outside. In the case of the liquefication of the head fraction from the pure argon column being performed exclusively outside of the condenser-evaporator, the heat exchange relationship can also be brought about by bringing the liquid cooling medium initially into indirect heat exchange with the head fraction from the pure argon column (for example, outside the condenser-evaporator) and then subsequently introducing the cooling medium into the first partial space of the condenser-evaporator.

By the subdivision of the evaporation space it is possible, in spite of the cost-effective use of a common condenser-evaporator, that in the second partial space the same increased oxygen concentration is attained as would result in a crude argon condenser operated in isolation. In the first partial space, on the other hand, there takes place an immaterially changed concentration as compared with the original composition of the cooling medium. The boiling point of the liquid in the first partial space is, therefore, lower than that in the second partial space. Accordingly, the cost-effective common condenser-evaporator is adapted to the different temperatures of the crude argon column and the pure argon column without any external regulation.

The cooling medium which has remained liquid may be withdrawn from the first partial space of the condenser-evaporator, that is to say liquid having a relatively high nitrogen content. As a result, it is possible to feed it into the lower pressure column at a relatively high locality and a correspondingly high contribution to the separation effect is possible.

The conventionally practiced head cooling of the pure argon column with nitrogen was frequently integrated into a heat pump which by liquefication of nitrogen against evaporating sump liquid from the pure argon column, transported heat from the upper region into the lower region of the pure argon column. In the context of the invention it was found that the use of other fractions for heating the pure argon column sump involved advantages.

A first modification resides in that the lower region of the pure argon column is heated by indirect heat exchange with a portion of the input air, from which the argon-enriched mixture is recovered and passed to the pure argon column. The sump heating of the pure argon column is accordingly operated with input air.

Preferably, latent heat is exchanged in the course thereof, that is to say a portion of the input air is condensed by the indirect heat exchange.

According to a second modification in accordance with the invention, the lower region of the pure argon column is heated by indirect heat exchange with a heating medium which is in a liquid condition.

Thus, the generally very efficient exchange of latent heat in the sump heating of the pure argon column is dispensed with. The heating of liquid from the lower region of the pure argon column is not brought about by the liquefication of a gaseous heating medium but by the withdrawal of sensible heat from a liquid flow.

The disadvantages which one might expect of this process step are, however, found to be very minor, since only a relatively small amount of liquid need be evaporated (approximately 0.5–2%, preferably about 0.5–1% of the total amount of air being separated). The relatively large flow of heating medium needed to provide such evaporation due to having dispensed with the exchange of latent heat, is thus quite feasible in absolute terms.

These aspects of the invention which relate to the heat input into the lower region of the pure argon column may—but need not—be combined with the previously mentioned aspects of the invention regarding the manner in which heat is withdrawn from the upper region of the same column.

In particular, in the combination of both aspects it is particularly advantageous to employ heating medium which has been subcooled during the sump heating of the pure argon column for use subsequently in the head cooling of the pure argon column and/or the crude argon column. As a heating medium for the sump heating of the pure argon column according to the invention, it is possible, for example, to employ any fraction which is available at high pressure, for example, any fraction from the high pressure column of a double column which during its withdrawal becomes available in liquid form or which after the withdrawal from the double column and prior to its use as heating medium becomes liquefied. Preferably, the heating medium is withdrawn from the lower or central region of the air separation column or a plurality of such columns in the case of a double column air separator, the heat medium in particular is preferably withdrawn from the high pressure stage of a double column. The use of sump liquid from the high pressure stage as a heating medium for the pure argon column is particularly advantageous. Advantageously, essentially the entire amount of sump liquid obtained in the lower region of the pressure column serves as the heating medium. Preferably, more than about 25% of the sump liquid is used as the heating medium, especially more than 50%, particularly more than 99%.

Accordingly, a single duct suffices in order to withdraw sump liquid from the high pressure column, to supply the sump heating means of the pure argon column with heating medium and, to pass the latter—optionally by way of further intermediate steps—to further rectification in the low pressure column. A separate duct for the heating medium of the pure argon column is not required, in particular regulating means for an appropriate division of the fraction used as heating medium is dispensed with.

The invention also relates to an apparatus for carrying out the process according to the invention. The apparatus comprises a rectification system having at least one air separation column and a pure argon column to which a feed duct is connected for feeding into the pure argon column an argon-enriched mixture of air gases, wherein a heat exchanger is connected by way of a vapor duct and by way of a condensate duct to the upper region of the pure argon column and a cooling medium duct, there being connected in the lower region of the pure argon column a product duct for substantially nitrogen-free argon product, wherein the cooling medium duct is connected to a source of cooling medium having an oxygen content of at least 10%.

According to another aspect, the apparatus comprises a rectification system having at least one air separation column and a pure argon column to which a feed duct is connected for the introduction of an argon-enriched mixture of air gases, wherein a heat exchanger is connected to the lower region of the pure argon column, and the heat exchanger includes a liquid duct for the introduction of a liquid heating medium.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

Figure 1:
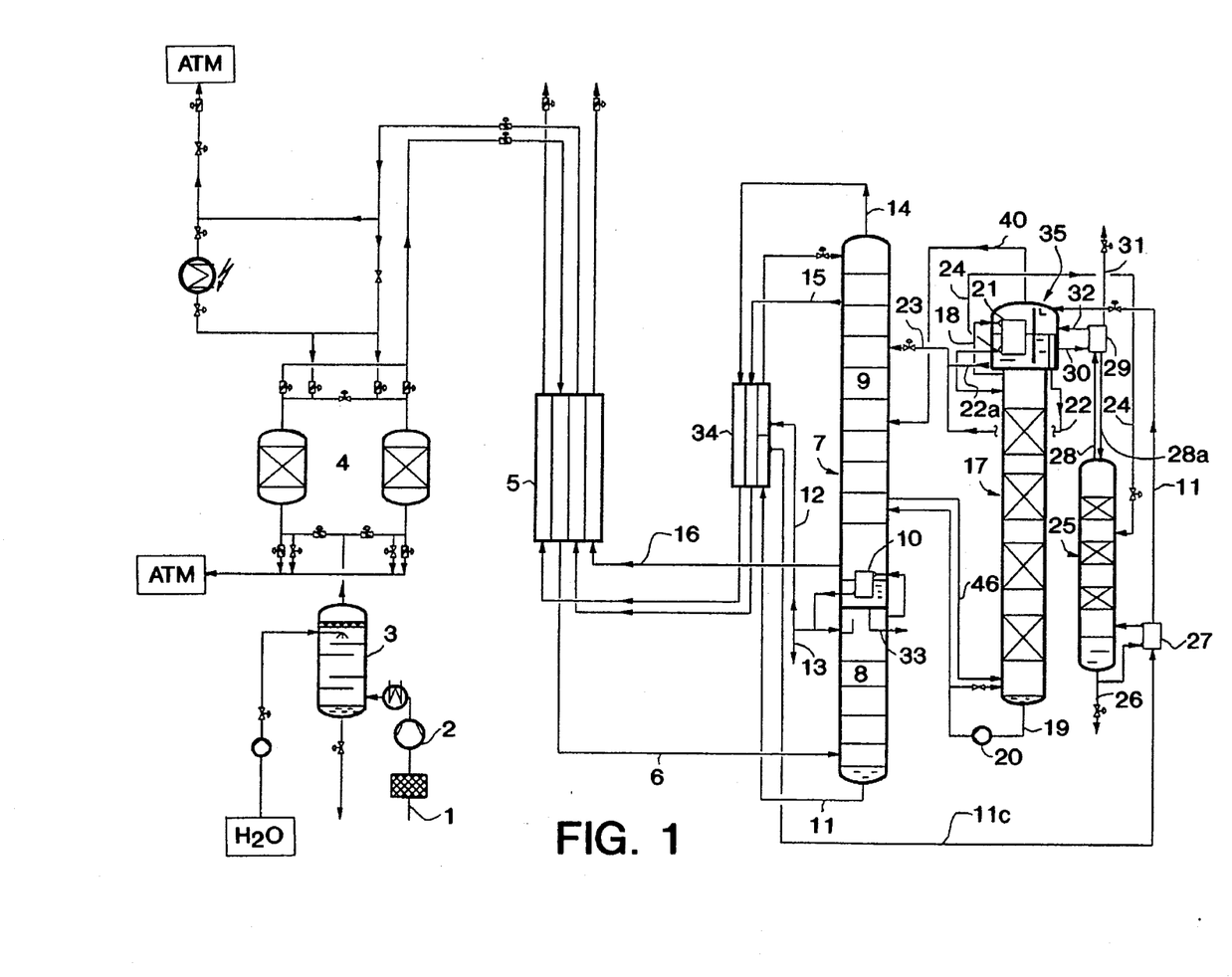
FIG. 1 illustrates a first, preferred embodiment of the invention.

In FIG. 1, an entire air separation process is illustrated. Atmospheric air is fed in at 1, for example, through a suction filter, compressed in an air compressor 2, precooled 3, e.g., by direct heat exchange with water, freed of carbon dioxide and water vapor in a molecular sieve section 4, cooled approximately to its dew point in a main heat exchanger 5 and finally introduced by way of duct 6 into the high pressure stage 8 of a double column 7. The high pressure stage 8 and the low pressure stage 9 of the double column 7 are in heat exchange relationship by way of a condenser-evaporator 10. Sump liquid 11, 23 and liquid nitrogen 12 from the high pressure column 8 are at least in part bled into the low pressure column 9. The products of the low pressure column 9, pure nitrogen 14, impure nitrogen 15 and gaseous oxygen 16, are heated in the main heat exchanger 5 to approximately ambient temperature against the air which is to be separated. If desired, it is also possible to recover liquid products: nitrogen by way of duct 13 and/or oxygen 33 from the sump of the low pressure column 9. Particularly in the latter case, refrigeration is as a rule generated by work-producing depressurization of process flows, for example, in a refrigeration circuit operated with air or nitrogen including one, two or more flash turbines (see, e.g., U.S. Pat. No. 4,883,518), or by work-producing depressurization of air to approximately the pressure level of the low pressure column 9 and direct feeding of the air into the low pressure column (see, e.g., U.S. Pat. No. 5,019,145).

At an intermediate location, i.e., between the head and the sump, of the low pressure column 9, an argon-containing oxygen fraction 46 is withdrawn and separated in a crude argon column 17 into crude argon 18 collected at the head of column 17 and a residual liquid 19 collected at the bottom, which—optionally with the assistance of a pump 20—is returned to the low pressure column 9. Oxygen-depleted argon (crude argon) is withdrawn by way of duct 24, preferably in a liquid state, and fed as an argon-enriched feed mixture into pure argon column 25. The crude argon fraction 24 still contains about 0.1–1000 ppm, preferably less than 10 ppm, most preferably less than 1 ppm of less volatile components (in particular, oxygen) and about 0.1–5% preferably 0.5–1%, more highly volatile impurities (in particular, nitrogen).

From the sump of the pure argon column 25, substantially nitrogen-free pure argon product 26 is withdrawn, preferably in a liquid state. The pure argon product 26 still contains by way of impurities 0.1–1000 ppm, preferably less than about 1 ppm oxygen and about 0.05–100 ppm, preferably less than 20 ppm, especially about 1 ppm or less of nitrogen. A portion of the head fraction 28 recovered from the pure argon column, which comprises about 20–80%, preferably about 40–60% nitrogen, is discharged as residual gas 31. The latter may be vented for example into the atmosphere or be fed into another residual flow, for example, the impure nitrogen flow 15 from the low pressure column 9.

In FIG. 1, head cooling of the crude argon column takes place in a condenser-evaporator 35 into which essentially the entire sump liquid from the high pressure column 8 is introduced. (Smaller portions of the sump fraction from the high pressure column 8 may be withdrawn by a different route, for example by way of a safety vent.) The high pressure column liquid is passed by way of a duct 11 through an subcooling counter-current apparatus 34. Thereafter, the high pressure column liquid is passed through a further heat exchanger 27 by duct 11c into the evaporation space of the condenser-evaporator 35. The precise construction of the condenser-evaporator is explained below with reference to FIG. 2. Gaseous crude argon from the head of the crude argon column 17 is passed by way of the duct 18 through a heat exchanger 21 which is installed in the liquid bath of the condenser-evaporator 35. A portion of the condensate formed in the heat exchanger 21 is fed as reflux into the crude argon column, another portion is withdrawn as an intermediate product 24.

Liquid (a proportion of about 1–10%, preferably 2–6% of the entire quantity of cooling medium advance by way of duct 11) flows by way of duct 30 into a further heat exchanger 29 which serves as the head condenser for pure argon column 25. The cooling medium evaporated in the heat exchanger 29 may be recycled by way of duct 32 into the evaporation space of the condenser-evaporator 35. The head fraction of the pure argon column enters into indirect heat exchange with the cooling medium by way of duct 28. Condensate formed in the course thereof flows by way of conduit 28a back again into the pure argon column 25. The gaseous remainder is withdrawn at 31.

The heat exchanger 27 serves to input heat into the lower region of the pure argon column 25. There, a portion of the sump liquid from the pure argon column is evaporated by indirect heat exchange against the liquid sump fraction 11 from the high pressure column 8 at a pressure of, for example, about 1–3 bar, preferably 1.2–2.0 bar. The heating medium 11 is subcooled in the course thereof. The resultant subcooled heating medium 11a is used in the following as described above, as a cooling medium for the generation of reflux for the crude argon column and the pure argon column.

The construction of the condenser-evaporator 35 is explained in detail with reference to FIG. 2. The partition 36 effects a partitioning into a first partial space 38 and a second partial space 39. The liquid and gas spaces of the two partial spaces 28, 39 intercommunicate as indicated in the drawing by the gaps, respectively, between the partition 36 and the bottom, on the one hand, and between the partition 36 and the lid or top of the condenser-evaporator 35, on the other hand. Accordingly, there exists a limited facility for the exchange of liquid and vapor, even though the two partial spaces are not in thermal dynamic equilibrium.

Sump liquid 11 from the high pressure column 8 is bled into the first partial space 38 by way of duct 11a, in a first modification. Part of the portion which in the course thereof remains liquid is passed by way of duct 30 to heat exchanger 29, which is provided outside of the condenser-evaporator 35, and evaporated therein by heat exchange with the condensing head fraction 28 from pure argon column 25. Gas thus formed is recycled by way of conduit 32 back into the first partial space 38 of the condenser-evaporator 35.

In the alternative or in addition, sump liquid from duct 11 can be fed directly into the heat exchanger 29 as indicated by the duct 11b shown in broken lines. The ducts 11a nd 30 can be dispensed with in the event that the entire sump liquid from duct 11 is passed in this manner. In another modification not illustrated in FIG. 2, heat exchanger 29 is installed in the liquid space of condenser-evaporator 35, preferably in the first partial space 38. In such a case, feed and discharge ducts 30, 32, 11b for the evaporator side can be dispensed with.

An amount of head gas is condensed in the heat exchanger 29 corresponding to about 0.5–8%, preferably about 1–4%, of the amount of air to be separated. Thus, only a small portion of the sump liquid from the high pressure column is evaporated in heat exchanger 29. Accordingly, the liquid in the first partial space 38 is almost in equilibrium with the fraction bled in by way of duct 11a and accordingly comprises a relatively high nitrogen content (about 60–70%) and thus has a correspondingly low evaporating temperature. On the other hand, this temperature is sufficiently high that even in the least favorable situation (very high argon concentration at the head of the pure argon column), no solid argon forms so that no regulating costs need to be incurred whatsoever. As a result, condensation of head gas 28 from the pure argon column can be carried out particularly effectively.

In the liquid bath of the second partial space 39, a further heat exchanger 21 is installed which serves as head and product condenser for the crude argon column 17. The second partial space 39 is connected to crude argon column 17 by way of head product duct 18 and the reflux duct 18*a*. The vapor generated at the heat exchanger 21 is withdrawn by way of the duct 40 from the second partial space 39. The corresponding amount of liquid flows from the first partial space 38 into the second partial space 39 by way of pressure equalization.

The heat conversion at heat exchanger 21 is about 10–40, preferably about 15–25, times more than that at the heat exchanger 29. As a result, a lower nitrogen concentration (about 25–40%) is established there which, however, suffices for head cooling of the crude argon column.

Figure 2:
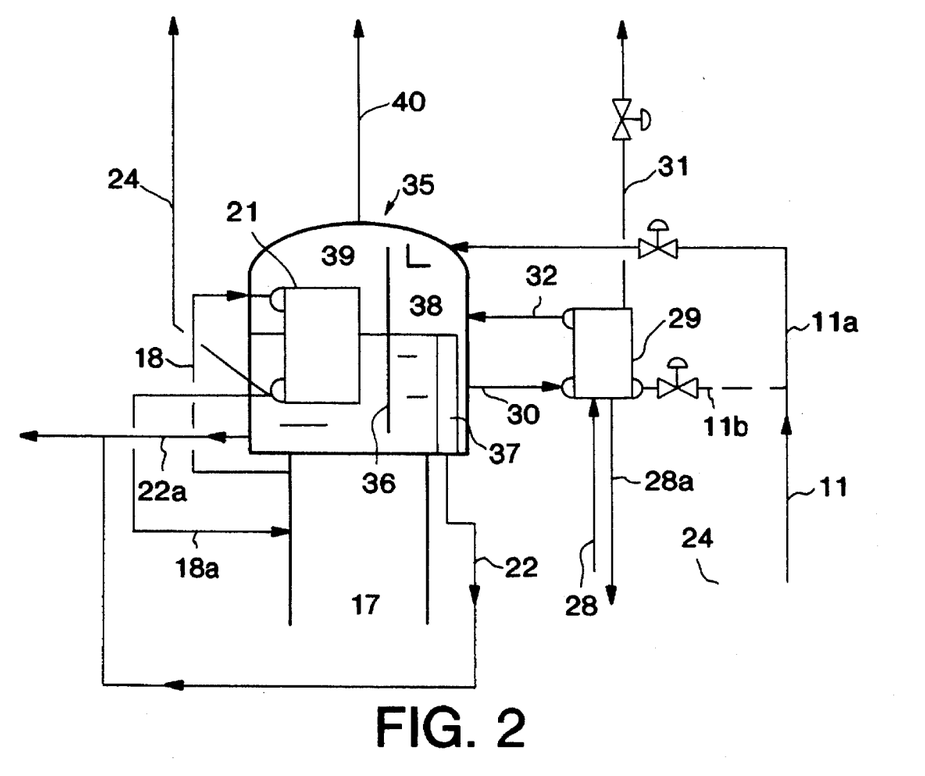
FIG. 2 illustrates the condenser-evaporator of FIG. 1 in detail.

Excess liquid flows by way of an overflow means 37 which in the example of FIG. 2 is put into practice in the form of an upwardly directed open tube provided in the evaporating space of the condenser-evaporator 35. The overflow means 37 is preferably provided in the first partial space 38. Because of the nitrogen concentration there prevailing, the liquid withdrawn by way of duct 22 can be fed into the low pressure column 9 at an intermediate locality positioned relatively high up and can thus contribute more effectively to the improvement of the rectification action of the low pressure column than could be done by the liquid from the second partial space 39. Duct 22*a* serves merely for optionally purging the condenser-evaporator 35. Small amounts of liquid can be withdrawn by duct 22*a* to avoid an enrichment of less volatile components in the liquid bath of the condenser-evaporator 35.

The entire arrangement is self-regulating, even in the event that the entire sump liquid from the high pressure column 8 passes through the condenser-evaporator 35. The heat exchanger 29 draws in the required amount of liquid by way of the duct 30, and the heat exchanger 21 does likewise by way of the connection of the liquid regions of partial spaces 38 and 39. The overflow means 37 takes care of a constant liquid level without regulating or control means being necessary therefor. The excess liquid, due to appropriate geometric arrangement and, by virtue of hydrostatic pressure, flows by way of duct 22 to the low pressure column.

Figure 3:
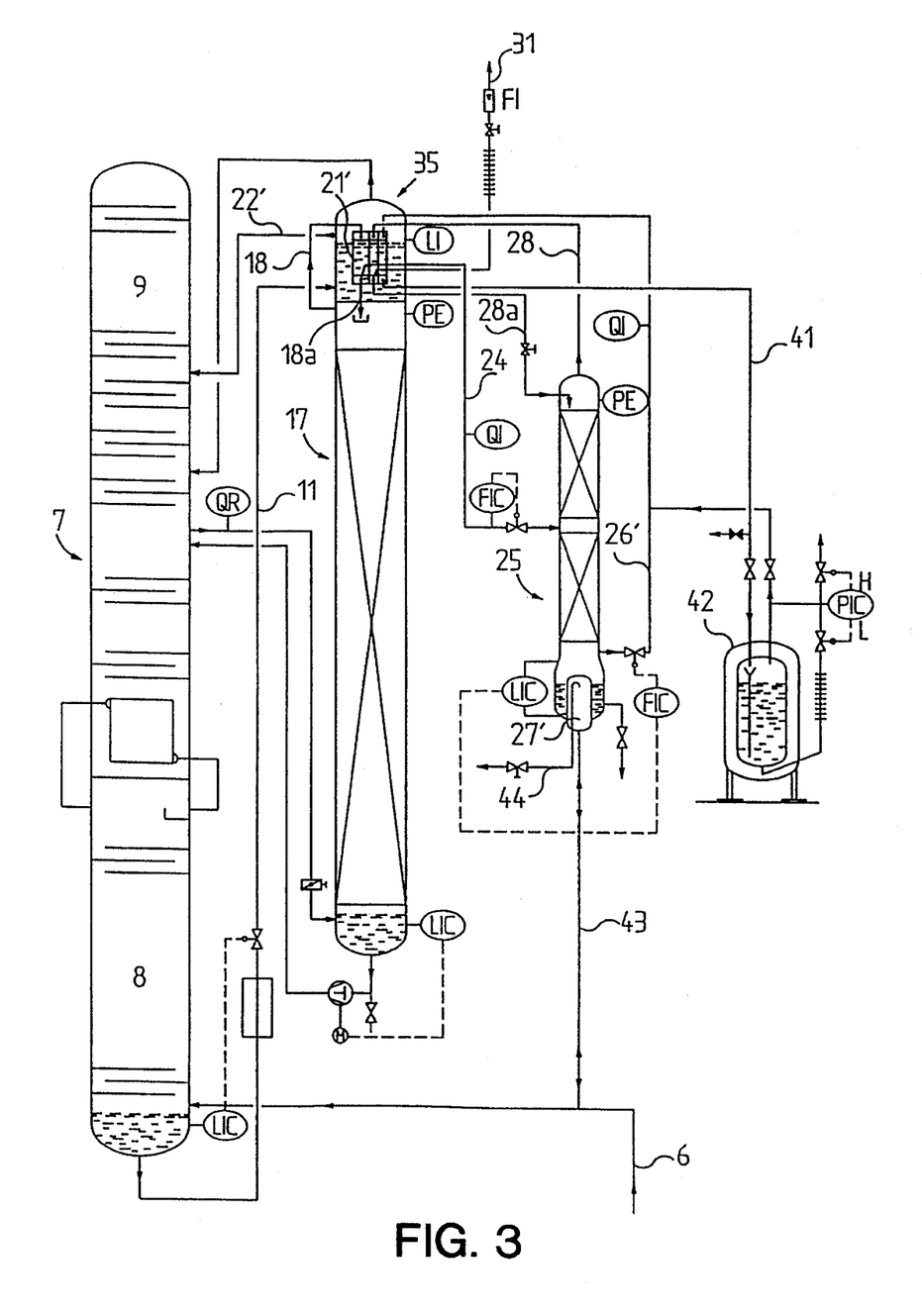
FIG. 3 shows a second embodiment according to the invention.
Figure 4:
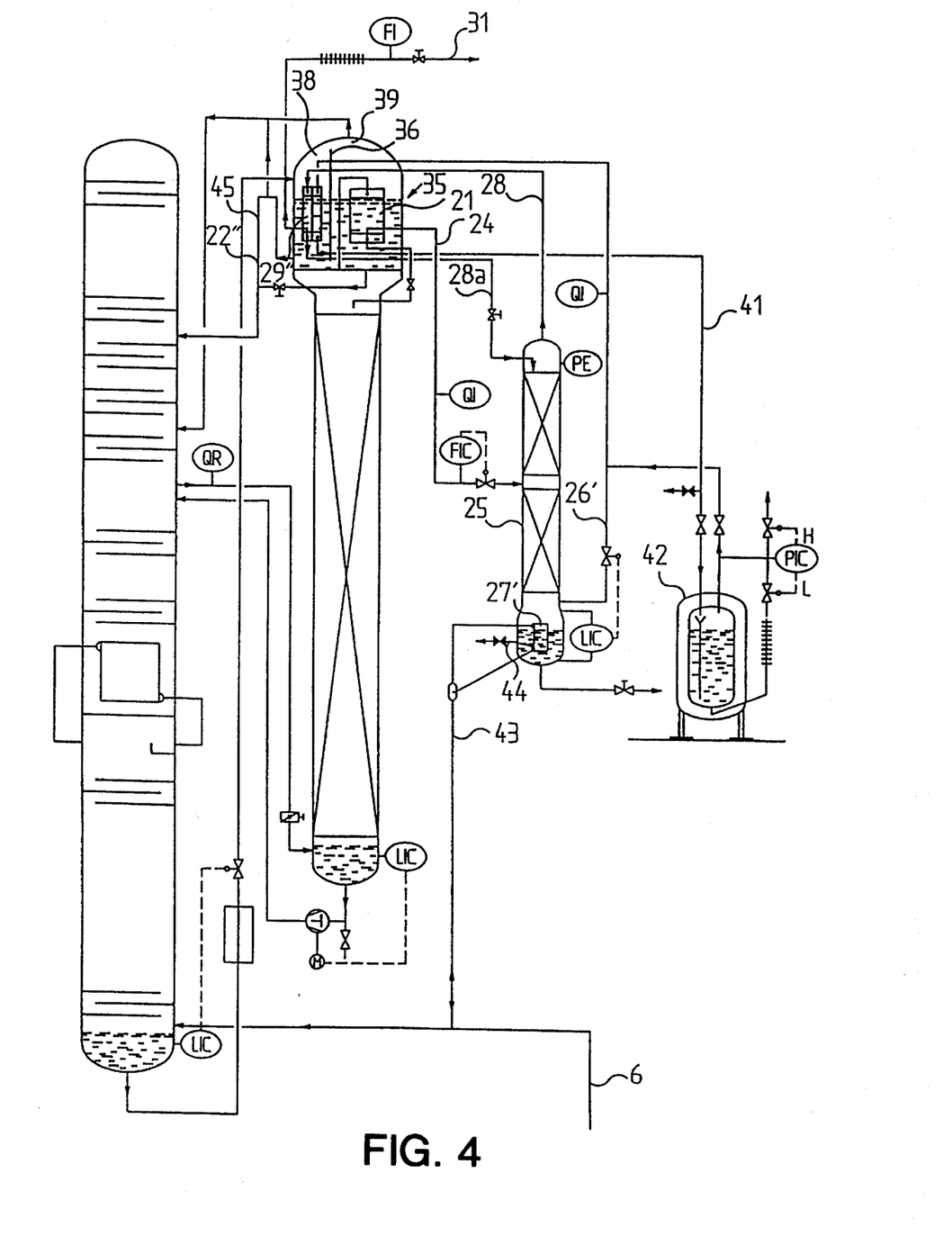
FIG. 4 represents a third embodiment of the invention.

FIGS. 3 and 4 illustrate portions of overall air separation processes wherein non-illustrated process steps which take place ahead of and around double column 7 correspond to those illustrated in FIG. 1. The remaining process steps and apparatus parts are denoted by the same reference symbols as in FIG. 1 to the extent that such counterparts exist in these embodiments.

Figure 5:
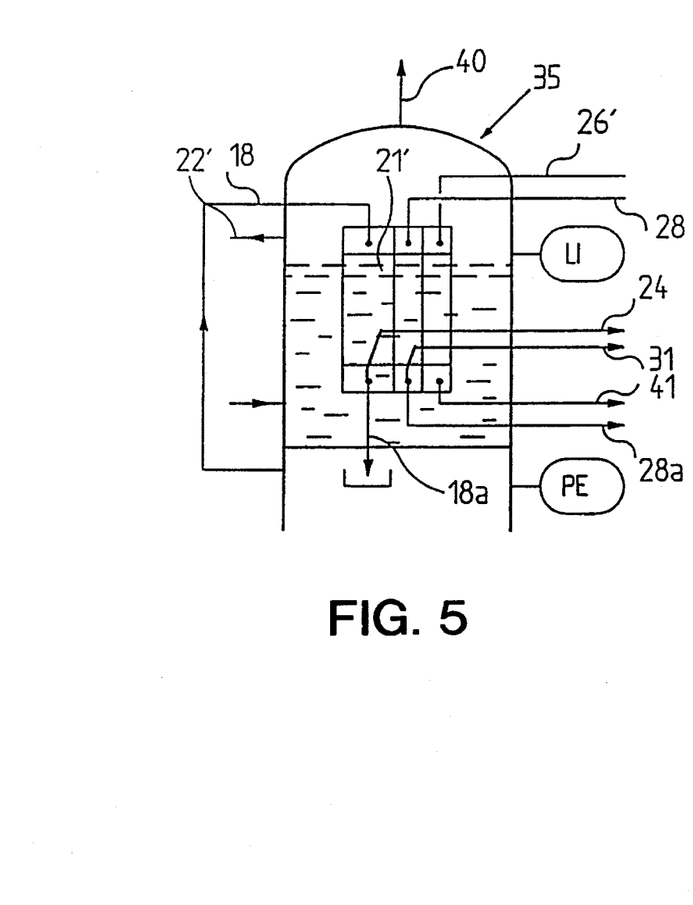
FIGS. 5 and 6 illustrate the condenser-evaporators according to FIGS. 3 and 4, respectively, in detail.

FIG. 3 illustrates an embodiment utilizing a modified design of condenser-evaporator 35, i.e., without it being partitioned into partial spaces. This modified design of the condenser-evaporator 35 is also illustrated in FIG. 5. The functions of the heat exchangers 21 and 29 of FIG. 1 are performed here by a common heat exchanger block 21': on the left-hand side are passages for crude argon 18 and in the center are passages for head gas 28 from pure argon column 25. In addition, on the right-hand side, passages are provided for the liquefication or subcooling of pure argon product which here is withdrawn from pure argon column 25 by way of duct 26' in gaseous form. (It stands to reason that the process and apparatus according to FIG. 1 can be modified in a corresponding manner, e.g., by additional passages in the heat exchangers 29 or 21 or by a further heat exchanger block in the condenser-evaporator 35, in particular in the first partial space 38.) The overflow means is here provided by an arrangement of the connection of the liquid duct 22' at the level of the desired liquid level. The purging duct (22*a* in FIG. 1) is not shown here.

In addition, there is illustrated in FIG. 3 a liquid tank 42 into which liquefied and subcooled pure argon product 41 is introduced. The control and regulating means are shown explicitly. The respective denotations are:

| | |
|---|---|
| LI | Liquid level measurement (liquid indication) |
| LIC | Liquid level measurement and regulation (liquid indication and control) |
| FIC | Through-flow measurement and adjustment (flow indication and control) |
| PE | Pressure measuring nipple (nozzle for pressure indication) |
| QR | Analyses recorder (recorder for analyzing) |
| PIC | Pressure indication and control |
| QI | Quality indication (i.e., measurement of composition or concentration of certain components) |

In addition, further details are shown which are not illustrated in FIG. 1, for example, draining ducts at the lower end of the crude argon column 17 and the pure argon column 25.

The sump heating 27' of the pure argon column 25 is operated in this example by means of a portion of purified and cooled air to be separated 6 which is advanced by way of a duct 43. Air condensed by indirect heat exchange with evaporating pure argon in the sump of the pure argon column 25 flows back by way of the same duct 43 and is fed into the high pressure column 8 jointly with the remaining air which is to be separated. A venting duct 44 prevents the blockage of the sump heating means 27' by non-condensable components, in particular helium and neon.

Figure 6:
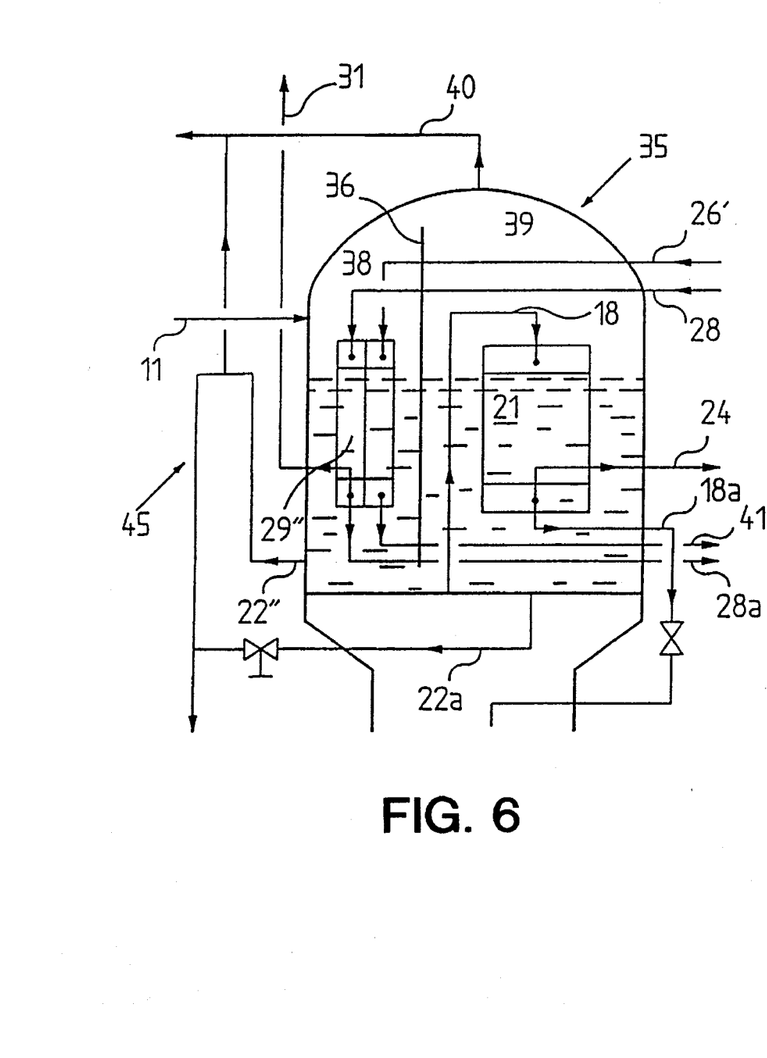

The embodiment illustrated in FIG. 4 differs from that illustrated in FIG. 3 in essence by a further modified design of the condenser-evaporator 35. This further modified design of the condenser-evaporator 35 is also illustrated in FIG. 6. Similar to FIG. 1, the condenser-evaporator 35 in this embodiment comprises a partition 36 arranged between a first partial space 38 and a second partial space 39 and permitting an exchange of liquid as well as vapor between the two partial spaces by pressure equilibration. The heat exchanger 29" for head gas 28 from pure argon column 25 is here provided within the first partial space 38 of the condenser-evaporator 35. Heat exchanger 29" also comprises passages for condensation/subcooling of pure argon product 26'. The duct 22" for the discharge of liquid from the evaporation portion of the condenser-evaporator 35 is provided below the liquid level. A branch 45 curved in siphon-like manner, the upper end of which is at the level of the liquid level, provides a constant liquid level in condenser-evaporator 35.

Without further elaboration, it is believed that one skilled in the art can, using the preceding description, utilize the present invention to its fullest extent. The preferred specific embodiments are, therefore, to be construed as merely illustrative, and not limitative of the remainder of the disclosure in any way whatsoever.

The preceding can be repeated with similar success by substituting the generically or specifically described reactants and/or operating conditions of this invention for those used therein.

In the foregoing, all temperatures are set forth uncorrected in degrees Kelvin and unless otherwise indicated, all parts and percentages are by volume.

The entire disclosure of all applications, patents and publications, cited above, and of corresponding German applications P 44 06 049.1 and P 44 06 069.6, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A process for the recovery of pure argon comprising:

separating air in a rectification system, said rectification system comprising at least one air separating column, a crude argon column, and a pure argon column;

passing an argon-containing fraction into said crude argon column;

recovering an oxygen-depleted argon stream from said crude argon column;

subjecting said oxygen-depleted argon stream to indirect heat exchange with a first portion of a cooling medium whereby at least part of said oxygen-depleted argon stream is liquefied;

introducing an argon-enriched mixture of air gases into said pure argon column;

at least partly liquefying a head fraction from said pure argon column by indirect heat exchange with a second portion of said cooling medium; and withdrawing a substantially nitrogen-free argon product from the lower region of said pure argon column;

wherein said first and second portions of said cooling medium each have an oxygen content of at least 10%, and said first and second portions of said cooling medium are jointly expanded upstream of said indirect heat exchanges.

2. A process according to claim 1, wherein said cooling medium is withdrawn from the lower or intermediate region of said at least one air separating column.

3. A process according to claim 2, wherein said at least one air separating column is a double column having a high pressure column and a low pressure column, and said cooling medium is withdrawn from the lower or intermediate region of said high pressure column.

4. A process according to claim 3, wherein said argon-containing fraction is removed from said at least one air separating column and passed into said crude argon column, and said indirect heat exchange between said oxygen-depleted argon stream and said first portion of said cooling medium is performed in a condenser-evaporator in which said first portion of said cooling medium is introduced into the evaporating side of said condenser-evaporator.

5. A process according to claim 4, further comprising withdrawing evaporated cooling medium from the evaporating side of said condenser-evaporator and introducing said evaporated cooling medium into said low pressure column at an intermediate point between the head and sump of said low pressure column.

6. A process according to claim 4, wherein said indirect heat exchange between said second portion of said cooling medium and said head fraction of said pure argon column is also performed inside said condenser-evaporator.

7. A process according to claim 6, wherein the amount of said cooling medium fed into said condenser-evaporator is greater than that needed for liquefication of said head fraction of said pure argon column and said oxygen-depleted stream from said crude argon column, and further comprising withdrawing from the evaporating side of said condenser-evaporator that portion of said cooling medium which has remained liquid and feeding same into said low pressure column at an intermediate point between the head and the sump of said low pressure column, and withdrawing evaporated cooling medium from the evaporating side of said condenser-evaporator and introducing said evaporated cooling medium into said low pressure column at an intermediate point between the head and sump of said low pressure column.

8. A process according to claim 7, wherein said cooling medium which has remained liquid is introduced into said low pressure column at a point above the point of introduction of said evaporated cooling medium.

9. A process according to claim 8, wherein substantially the entire sump liquid from the lower region of said high pressure column is employed as said cooling medium.

10. A process according to claim 3, wherein said cooling medium is sump liquid removed from the lower region of said high pressure column.

11. A process according to claim 1, wherein said argon-containing fraction is removed from said at least one air separating column and passed into said crude argon column, and said indirect heat exchange between said oxygen-depleted argon stream and said first portion of said cooling medium is performed in a condenser-evaporator in which said first portion of said cooling medium is introduced into the evaporating side of said condenser-evaporator.

12. A process according to claim 11, wherein said second portion of said cooling medium is brought into indirect heat exchange with said head fraction of said pure argon column upstream of the introduction of said first portion of said cooling medium into said condenser-evaporator.

13. A process according to claim 11, wherein said indirect heat exchange between said second portion of said cooling medium and said head fraction of said pure argon column is also performed inside said condenser-evaporator.

14. A process according to claim 13, wherein the amount of said cooling medium fed into said condenser-evaporator is greater than that needed for liquefication of said head fraction of said pure argon column and said oxygen-depleted stream from said crude argon column, and further comprising withdrawing from the evaporating side of said condenser-evaporator that portion of said cooling medium which has remained liquid and feeding same into said low pressure column at an intermediate point between the head and the sump of said low pressure column.

15. A process according to claim 14, wherein substantially the entire sump liquid from the lower region of said high pressure column is employed as said cooling medium.

16. A process according to claim 14, wherein said cooling medium which has remained liquid is withdrawn by way of an overflow means.

17. A process according to claim 11, wherein the evaporating side of said condenser-evaporator is partitioned by a partition into a first partial space and a second partial space in which gas and the liquid spaces within two partial spaces intercommunicate, said second portion of said cooling medium is introduced into said first partial space and said first partial space is in heat exchange relationship with said head fraction of said pure argon column, and said first portion of said cooling medium is introduced into said second partial space and said second partial space is in heat exchange relationship with said oxygen-depleted argon stream from said crude argon column.

18. A process according to claim 17, wherein that part of said cooling medium which has remained liquid is withdrawn from said first partial space of said condenser-evaporator.

19. A process according to claim 1, wherein the lower region of said pure argon column is heated by indirect heat exchange with part of the feed air.

20. A process according to claim 19, wherein a part of said feed air condenses in the course of said indirect heat exchange with the lower region of said pure argon column.

21. A process according to claim 1, wherein the lower region of said pure argon column is heated by indirect heat exchange with a liquid heating medium.

22. A process according to claim 21, wherein at least part of said liquid heating medium, downstream of said indirect heat exchange for heating the lower region of said pure argon column, forms said cooling medium.

23. A process according to claim 22, further comprising removing said argon-containing fraction from said at least one air separation column and introducing it into said crude argon column, and recovering said oxygen-depleted argon stream from the head of said crude argon column.

24. A process according to claim 21, wherein said heating medium is withdrawn from the lower or intermediate region of said at least one air separation column.

25. A process according to claim 24, wherein said at least one air separation column is a double column having a high pressure column and a low pressure column, and said liquid heating medium is withdrawn from the lower or intermediate region of said high pressure column.

26. A process according to claim 25, wherein sump liquid from the lower region of said high pressure column is used as said liquid heating medium.

27. A process according to claim 21, wherein essentially the entire sump liquid from the lower region of said high pressure column is used as said liquid heating medium.

28. A process according to claim 1, wherein said indirect heat exchange between said oxygen-depleted argon stream from said crude argon column and said first portion of said cooling medium and said heat exchange between said head fraction of said pure argon column and said second part of said cooling medium are both performed in the same condenser-evaporator and said first and second portions of said cooling medium are both fed into the evaporating side of said condenser-evaporator.

29. A process according to claim 1, wherein said first portion of said cooling medium, upstream of said indirect heat exchange with said oxygen-depleted argon stream, and said second portion of said cooling medium, downstream of said indirect heat exchange with said head fraction of said pure argon column, are both fed into a condenser-evaporator.

30. A process according to claim 1, wherein said first portion of said cooling medium, at said indirect heat exchange with said oxygen-depleted argon stream, has the same pressure as said second portion of said cooling medium, at said indirect heat exchange with said head fraction from said pure argon column.

31. A process according to claim 1, further comprising returning condensate formed by said indirect heat exchange between said second portion of said cooling medium and said head fraction from said pure argon column to said pure argon column.

32. A process for the recovery of pure argon comprising:
separating air in a rectification system, said rectification system having at least one air separation column and a pure argon column;
introducing an argon-enriched mixture of air gases into said pure argon column;
withdrawing a substantially nitrogen-free argon product from the lower region of said pure argon column; and
heating the lower region of said pure argon column by indirect heat exchange with a liquid heating medium.

33. A process according to claim 32, wherein said liquid heating medium, downstream of said indirect heat exchange for heating the lower region of said pure argon column, is at least in part subjected to indirect heat exchange with a gaseous fraction from the head of said pure argon column.

34. A process according to claim 32, further comprising removing an argon-containing fraction from said at least one air separation column and introducing it into a crude argon column, recovering at the head of said crude argon column an oxygen-depleted argon stream, and liquefying a part of said oxygen-depleted argon stream by indirect heat exchange with at least a portion of said heating medium downstream of said indirect heat exchange for heating the lower region of said pure argon column.

35. A process according to claim 32, wherein said heating medium is withdrawn form the lower or intermediate region of said at least one air separation column.

36. A process according to claim 35, wherein said at least one air separation column is a double column having a high pressure column and a low pressure column, and said liquid heating medium is withdrawn from the lower or intermediate region of said high pressure column.

37. A process according to claim 36, wherein sump liquid from the lower region of said high pressure column is used as said liquid heating medium.

38. A process according to claim 32, wherein essentially the entire sump liquid from the lower region of said high pressure column is used as said liquid heating medium.

39. An apparatus for separating air and recovering pure argon, said apparatus comprising:
a rectification system, comprising at least one air separation column, a crude argon column and a pure argon column,
a first conduit in fluid communication with said air separation column and said crude argon column for introducing fluid from said air separation column into said crude argon column,
a second conduit in fluid communication with said crude argon column and said pure argon column for introducing fluid from said crude argon column into said pure argon column, and
a heat exchanger in heat exchange relationship with the lower region of said pure argon column,
wherein said heat exchanger is also connected to a liquid duct and said liquid duct is connected to a source of liquid heating medium.

40. An apparatus for separating air and recovering pure argon, said apparatus comprising:
a rectification system comprising at least one air separation column, a crude argon column, and a pure argon column,
a first feed duct connected to said crude argon column for introducing an argon-containing fraction,
a second feed duct connected to said pure argon column for introducing an argon-enriched mixture of air gases,
a first heat exchanger in fluid communication with the upper region of said crude argon column by a first vapor duct and by a first condensate duct,
a second heat exchanger in fluid communication with the upper region of said crude argon column by a second vapor duct and a second condensate duct,
a cooling medium duct connected to a source of cooling medium having an oxygen content of at least 10%, and
expansion means positioned in said cooling medium duct,
wherein said cooling medium duct, downstream of said expansion means, is in fluid communication with said first and second heat exchangers.

41. A process for recovery of pure argon comprising:

separating air in rectification systems, said rectification system comprising at least one air separation column, a crude argon column, and a pure argon column;

passing an argon-containing fraction into said crude argon column;

recovering an oxygen-depleted argon stream from said crude argon column;

introducing an argon-enriched mixture of air gases into said pure argon column;

at least partly liquefying a head fraction from said pure argon column by indirect heat exchange with at least a portion of a cooling medium; and subjecting said oxygen-depleted argon stream to indirect heat exchange in a condenser-evaporator;

wherein said portion of said cooling medium is fed into said condenser-evaporator after said indirect heat exchange with said head fraction of said pure argon column, and said cooling medium has an oxygen content of at least 10%.

42. A process according to claim 41, wherein a portion of said cooling medium is introduced into said condenser-evaporator without having undergone indirect heat exchange with said head fraction of said pure argon column.

* * * * *